(12) United States Patent
Hansen et al.

(10) Patent No.: US 8,507,154 B2
(45) Date of Patent: Aug. 13, 2013

(54) VOLUME HOLOGRAM COMPRISING EXPANSION AGENT LAYER OR CONTRACTION AGENT LAYER FOR CREATING COLOR PATTERNS

(75) Inventors: Achim Hansen, Zug (CH); Wayne Robert Tompkin, Baden (CH); Markus Burkhardt, Zirndorf (DE); Michael Scharfenberg, Nürnberg (DE)

(73) Assignee: OVD Kinegram AG, Zug (CH)

( * ) Notice: Subject to any disclaimer, the term of this patent is extended or adjusted under 35 U.S.C. 154(b) by 81 days.

(21) Appl. No.: 13/124,557

(22) PCT Filed: Oct. 16, 2009

(86) PCT No.: PCT/EP2009/007429
§ 371 (c)(1), (2), (4) Date: May 23, 2011

(87) PCT Pub. No.: WO2010/043403
PCT Pub. Date: Apr. 22, 2010

(65) Prior Publication Data
US 2011/0212387 A1    Sep. 1, 2011

(30) Foreign Application Priority Data

Oct. 17, 2008  (DE) .................. 10 2008 052 067

(51) Int. Cl.
*G03H 1/02*    (2006.01)
(52) U.S. Cl.
USPC ................ 430/1; 430/2; 430/321; 359/3

(58) Field of Classification Search
None
See application file for complete search history.

(56) References Cited

U.S. PATENT DOCUMENTS

| | | | | |
|---|---|---|---|---|
| 3,484,313 A * | 12/1969 | Takagi et al. | ............... | 438/543 |
| 3,854,791 A * | 12/1974 | Takeda et al. | ................... | 359/11 |
| 4,518,666 A * | 5/1985 | Quinn et al. | ...................... | 430/7 |
| 4,950,567 A * | 8/1990 | Keys et al. | ......................... | 430/1 |
| 4,963,471 A * | 10/1990 | Trout et al. | ................ | 430/282.1 |
| 4,965,152 A * | 10/1990 | Keys et al. | ......................... | 430/1 |
| 5,182,180 A | 1/1993 | Gambogi, Jr. et al. | | |
| 5,278,008 A * | 1/1994 | Moss et al. | ......................... | 430/1 |
| 5,415,950 A * | 5/1995 | King et al. | ......................... | 430/2 |
| 5,453,339 A * | 9/1995 | Frost et al. | ....................... | 430/1 |
| 5,856,048 A | 1/1999 | Tahara et al. | | |
| 6,667,819 B2 * | 12/2003 | Nishikawa et al. | ............ | 359/15 |
| 6,747,768 B1 | 6/2004 | Knocke et al. | | |
| 2008/0316556 A1 * | 12/2008 | Eto et al. | ........................... | 359/3 |

(Continued)

FOREIGN PATENT DOCUMENTS

DE    102006016139    10/2007
DE    102006048768    4/2008

(Continued)

OTHER PUBLICATIONS

Nam Kim: "Holographic Applications Based on Photopolymer Materials," International Workshop on Photonics and Applications, pp. 190-200, Apr. 5-8, 2004.

*Primary Examiner* — Martin Angebranndt
(74) *Attorney, Agent, or Firm* — Hoffmann & Baron, LLP (57) ABSTRACT

The invention concerns a security element in the form of a multi-layer film body having a volume hologram layer with two different items of optical information and a process for the production of such a security element.

18 Claims, 5 Drawing Sheets

(56) References Cited

U.S. PATENT DOCUMENTS

2009/0162756 A1 6/2009 Staub et al.
2009/0262407 A1 10/2009 Dausmann et al.
2011/0049864 A1* 3/2011 Menz et al. .................. 283/86

FOREIGN PATENT DOCUMENTS

| | | |
|---|---|---|
| EP | 1187728 | 3/2002 |
| WO | WO2007131496 | 11/2007 |
| WO | WO2008043351 | 4/2008 |

* cited by examiner

VOLUME HOLOGRAM COMPRISING EXPANSION AGENT LAYER OR CONTRACTION AGENT LAYER FOR CREATING COLOR PATTERNS

This application claims priority based on an International Application filed under the Patent Cooperation Treaty, PCT/EP2009/007429, filed on Oct. 16, 2009 and German Application No. DE 102008052067.5-45, filed on Oct. 17, 2008.

BACKGROUND OF THE INVENTION

The invention concerns a security element in the form of a multi-layer film body having a volume hologram layer with two different items of optical information and a process for the production of such a security element.

Holograms are used as security elements for protecting security documents such as banknotes, money replacement means, credit cards, passports or ID documents as well as for product security. Mass-produced articles frequently use surface holograms which make it possible to achieve interesting, optically variable effects, for example motion effects, and which are distinguished by a high level of light strength.

Volume holograms, also referred to as white light holograms or Lippmann holograms, in contrast to surface holograms, are based on light diffraction at the Bragg planes of a transparent layer which has local refractive index differences.

A security element having a volume hologram and the production of such a security element is described for example in DE 10 2006 016 139 A1. A surface relief is used as the master for production of a multi-layer body which includes a volume hologram. The front side of the master is brought into contact with the photosensitive layer of the multi-layer body in which the volume hologram is to be recorded, directly or with the interposition of a transparent optical medium. The master is then exposed with coherent light, in which case an interference pattern is produced by superimpositioning of the light radiated on to the master and the light diffracted by the master, the interference pattern being recorded in the photosensitive layer as a volume hologram. The volume hologram which is introduced into the photosensitive layer in that way is then fixed by hardening of the photosensitive layer. In that respect, two or more separate items of image information can be written into the photosensitive layer by virtue of the master being of a special configuration.

In addition EP 1 187 728 B1 describes laminating two volume hologram layers on to each other, in which layers items of image information have been written by means of different holographic recording processes. That gives the viewer an overall impression which is composed of the items of image information of the two volume hologram layers. In that case however there is the disadvantage that the security elements which are made up of two volume hologram layers are relatively thick and it is difficult for the two volume holograms to be laminated on to each other in accurately fitting relationship.

It is known that organic solvents which are brought into contact with volume holograms can increase the degree of diffraction effectiveness and can influence chromaticity. Diffusion of organic molecules into the volume hologram can cause swelling and thus a change in the spacing of the holographic lattice planes, which in particular for reflection volume holograms results in a colour enhancement effect (U.S. Pat. No. 5,415,950). It will be noted however that it is not possible with solvents to swell only partial parts of the hologram which represent new visible information. Expansion agents are required for that purpose, the diffusion properties of which can be varied in locally specifically targeted fashion.

WO 2007/131496 describes a process in which a holographic photofilm is brought into contact with a light-hardenable expansion agent which is subjected to mask exposure so that differentiated expansion of the photofilm occurs due to differentiated diffusion of the expansion agent in the photofilm, wherein expansion is terminated after a defined period of time by complete exposure of the expansion agent.

U.S. Pat. No. 5,182,180 describes a process in which a partially exposed diffusion film is applied to a volume hologram, thereby causing local swelling of the volume hologram.

SUMMARY OF THE INVENTION

Now the object of the invention is to provide an improved security element and a process for the production thereof.

That object is attained by a process for the production of a security element in the form of a multi-layer film body, in particular a lamination film or a transfer film, including the steps:

a1) providing a carrier film, b1) applying a volume hologram layer formed from a photopolymer to the carrier film, c1) applying at least one expansion agent and/or contraction agent to the volume hologram layer, wherein either c1.1) at least one printable expansion agent and/or printable contraction agent is partially applied to the volume hologram layer, or c1.2) at least one mask layer is partially applied to the volume hologram layer and then a full-area layer of an expansion agent and/or contraction agent is applied to the mask layer and regions free therefrom of the volume hologram layer, d1) allowing at least partial diffusion of the expansion agent and/or contraction agent into the volume hologram layer with local expansion and/or contraction of the Bragg grating, thereby providing a second item of optical information, or a2) providing a carrier film, b2) partially applying at least one expansion agent and/or contraction agent to the carrier film, wherein either b2.1) at least one printable expansion agent and/or printable contraction agent is partially applied to the carrier film or b2.2) at least one full-area layer of an expansion agent and/or contraction agent is applied to the carrier film and then at least one mask layer is partially applied to the expansion agent and/or contraction agent, c2) applying a volume hologram layer formed from a photopolymer to the expansion agent and/or contraction agent and the mask layer which partially covers over the expansion agent and/or contraction agent, and d2) allowing at least partial diffusion of the expansion agent and/or contraction agent into the volume hologram layer with local expansion and/or contraction of the Bragg grating, thereby providing a second item of optical information, wherein the mask layer is at least partially impervious to the expansion agent and/or contraction agent and has openings which are pervious to the expansion agent and/or contraction agent, and wherein different refractive indices are formed region-wise in the photopolymer of the volume hologram layer, which refractive indices provide a Bragg grating with the provision of a first item of optical information.

Preferably the term optical information is used to denote an item of visually recognisable or machine-readable information.

The term lamination films is used to denote in particular film bodies having a self-supporting carrier film on to which further layers are applied by lamination. Preferably an adhesive layer is arranged between the self-supporting carrier film and the further layers. That preferably ensures that the self-supporting carrier film cannot be detached from the further layers.

The term transfer films is used to denote in particular film bodies having a carrier film and a layer (layer stack) detachable therefrom. Upon application of the transfer film to a substrate the layer/layer stack is fixed on the substrate and then the carrier film is pulled off. In that case the layer or layer stack is usually not self-supporting. Transfer films can be in the form of embossing films, in particular hot embossing films. Transfer films are used for example in trade mark protection. The trade marks can be transferred on to containers, stickers, labels, tickets and/or CD sleeves by the transfer films.

Security elements are elements which are used in particular for increasing the level of protection against forgery of security documents and for safeguarding products. Such security documents include for example banknotes, money replacement means, bank cards, passports, stocks and shares certificates, lottery tickets and/or ID documents.

The term photopolymer is used to denote in particular a polymer medium in which there is distributed a photosensitive material suitable for producing light-refracting structures when the photopolymer is irradiated with coherent light. For example gelatines, carragheenin, starch, agar, agarose, polyvinyl alcohol, acrylates, methacrylates, polysaccharides, proteins, cellulose, cellulose acetate, polyamides, polyols, in particular polyether polyol, polyisocyanates, polyimides, polyacrylamides, polystyrene and/or copolymers thereof can be used as the polymer medium.

As typical polymers it is possible to use polyvinylpyrrolidone, polyhydroxyethyl acetate, polyhydroxyethyl methacrylate, polymethacrylamide and/or polyacrylamide. Polyhydroxyethyl methacrylate is particularly preferably used.

Preferably castor oil and/or castor oil derivatives are added to the volume hologram layer.

The photopolymer medium should further be suitable to involve volume expansion after diffusion of expansion agent therein and/or volume contraction after diffusion of contraction agent therein.

For example silver halide particles can be used as the photosensitive material. Alternatively it is also possible to use a photopolymer medium in which a Bragg grating can be produced by selective irradiation and polymerisation. There a photoinitiation polymerisation initiator is preferably added to the photopolymer medium as the photosensitive material. For example quinone, photoreducible dyes, trichloromethyl triazines and/or 2,4,5-triphenylimidazolyldimers are used as photoinitiators.

In principle besides photopolymerisable systems other photoreactive, photochromic and/or photorefractive systems are also suitable, as are used for example for photographic purposes.

The volume hologram layer preferably includes a Bragg grating comprising at least two Bragg lattice planes. In an embodiment the volume hologram layer has 2 to 100, preferably 5 to 50, further preferably 5 to 20, Bragg lattice planes. Within the Bragg lattice planes there are local changes in the refractive index.

In an embodiment the volume hologram layer is of a thickness of 5 µm to 250 µm, preferably 5 to 100 µm, further preferably 10 to 30 µm.

In an embodiment of the process according to the invention prior to diffusion of the expansion agent and/or contraction agent into the volume hologram layer in step d1) or d2) the volume hologram is written into the photopolymer of the volume hologram layer, providing the first item of optical information. In another embodiment of the process according to the invention it is after diffusion of the expansion agent and/or contraction agent into the volume hologram layer in step d1) or d2) that the volume hologram is written into the photopolymer of the volume hologram layer providing the first item of optical information.

In the process according to the invention the security element, the carrier film, the volume hologram layer, the printable expansion agent and/or printable contraction agent can be arranged as follows:
  carrier film
  expansion agent and/or contraction agent
  volume hologram layer
or
  carrier film
  volume hologram layer
  expansion agent and/or contraction agent In an alternative embodiment of the process according to the invention the security element, the carrier film, the volume hologram layer, the mask layer, the printable expansion agent and/or printable contraction agent can be arranged as follows:
  carrier film
  expansion agent and/or contraction agent,
  mask layer
  volume hologram layer
or
  carrier film
  volume hologram layer
  mask layer
  expansion agent and/or contraction agent.

The layers of the security element can each be applied in a printing process.

In an embodiment the first item of optical information is produced in the photopolymer, providing a volume hologram layer, by irradiation with two light beams of coherent light. The volume hologram layer is preferably formed from a Bragg grating with at least two Bragg planes. Preferably the photopolymer is then partially thermally or beam-hardened to fix the first item of optical information. The term beam hardening in accordance with the invention in this or one of the following steps can be used to denote hardening by UV, VIS and/or IR radiation. Preferably hardening is effected with UV radiation. The first item of optical information is a volume hologram which exhibits for example an image, text, logo, photograph, bar code, film, guilloche pattern, design element or other security-relevant information. The volume hologram can extend through the entire volume hologram layer or only through parts thereof. The expression security-relevant information is used to denote optical information which can serve to check the security element for authenticity.

Before the volume hologram is written into the volume hologram layer the volume hologram layer can be partially thermally or beam-hardened. After the volume hologram is written into the volume hologram layer the volume hologram layer can be completely hardened. That step can be carried out prior to or after application of the barrier layer. Hardening of the volume hologram layer can be effected together with hardening of a barrier layer possibly applied thereto.

Further layers can be arranged between the carrier film and the volume hologram layer or between the volume hologram layer and the expansion agent and/or contraction agent.

A separation layer can be applied between the plane in which the expansion agent and/or contraction agent is applied and the volume hologram layer. A separation layer can be applied between the plane in which the expansion agent and/or contraction agent is applied and the mask layer or between the plane of the mask layer and the volume hologram layer. The term separation layer is used to denote a layer which reduces or prevents diffusion of the expansion agent and/or contraction agent into the volume hologram layer, wherein the separation layer can be inactivated, for example by thermal treatment or pressure treatment, so that the expansion agent and/or contraction agent diffuses into the volume hologram layer. In an alternative embodiment, instead of the separation layer, the expansion agent and/or contraction agent can also be encapsulated. The encapsulation material reduces or prevents preferably diffusion of the expansion agent and/or contraction agent into the volume hologram layer, wherein the encapsulation material can be inactivated for example by thermal treatment and/or pressure treatment so that the expansion agent and/or contraction agent diffuses into the volume hologram layer. For example wax can be used as the separation layer or as the encapsulation material. Inactivation of the separation layer can be effected prior to or after the volume hologram is written into the volume hologram layer.

A surface relief can be used to produce the volume hologram layer. The front side of the surface relief can be brought into contact with the photopolymer layer of the multi-layer body in which the volume hologram is to be written, directly or with the interposition of a transparent optical medium. Then the surface relief can be exposed with coherent light through the photopolymer layer, wherein the superimposition of the light diffracted by the surface relief provides for the creation of an interference pattern which is written in the photopolymer layer as a volume hologram. Preferably the volume hologram introduced into the photopolymer layer in that way is fixed after partial hardening of the photopolymer layer by thermal hardening and/or beam-hardening. A preferred embodiment involves a metallic surface relief. The surface relief is preferably removed after partial hardening of the photosensitive layer. Post-hardening can then be still further partially effected. The expression partial hardening of the photosensitive layer is preferably used to mean that the photosensitive polymer layer is not completely polymerised out, so that expansion agent and/or contraction agent can diffuse into the photosensitive layer. The photosensitive polymer layer can then possibly be hardened by thermal hardening and/or beam-hardening of the expansion agent and/or contraction agent by further polymerisation.

In an embodiment of the process according to the invention a surface relief is applied to the volume hologram layer and the volume hologram is written therein by irradiation of the volume hologram layer from the side remote from the surface relief. The surface relief can then be removed. In an embodiment the expansion agent and/or contraction agent and optionally the mask layer is applied on the side of the volume hologram that is remote from the surface relief. In another embodiment the expansion agent and/or contraction agent and optionally the mask layer is applied on the side of the volume hologram layer, on which the surface relief is or was arranged.

With the process according to the invention the spacing of the Bragg planes can be increased and/or reduced by diffusion of at least one expansion agent and/or contraction agent, leading to a colour shift in the volume hologram. Alternatively the contraction agent can also remain on the volume hologram layer and can suck monomers or other low-molecular substances out of the volume hologram layer, whereby contraction occurs in the volume hologram layer. Preferably the expansion agent and/or contraction agent is applied on the side of the volume hologram layer, from which the radiation with which the volume hologram was written in was applied. The colour can be shifted by expansion agent to greater wavelengths, possibly into the red colour range, preferably even into the infrared range. The region of the volume hologram whose colour is shifted into the infrared range by diffusion of the expansion agent therein appears transparent. The colour can be shifted into the short-wave range, possibly into the blue colour range, by contraction agent. In that way a second item of optical information can be provided by specifically targeted local application of an expansion agent and/or contraction agent. The second item of optical information can be for example an image, text, logo, photograph, bar code, film, guilloche pattern, design element or other security-relevant information. The diffusion effect can be accelerated by a thermal tempering procedure. Preferably tempering is effected at a temperature of 20° C. to 140° C., preferably 20° C. to 100° C., most preferably 20° C. to 30° C., over a period of 5 seconds to 120 minutes, preferably 30 seconds to 10 minutes. At temperatures around ambient temperature (25° C.) the colour shift is effected in highly co-ordinated fashion and can be stopped at the correct colour.

Thus the specifically targeted application of the expansion agent and/or contraction agent makes it possible to vary the color of the first item of optical information in specifically targeted fashion. Preferably however an image, text, logo, photograph, bar code, film, guilloche pattern, design element and/or other security-relevant information which is independent of the first item of auxiliary information is represented with the second item of optical information. The expansion agent can also be referred to as a swelling agent. The contraction agent can also be referred to as a shrinkage agent.

In the process according to the invention, in step c1) or b2) in an embodiment a printable expansion agent and/or a printable contraction agent can be applied to the volume hologram layer. The term 'printable' is preferably used to mean that the corresponding agents can be applied to the volume hologram layer partially in the form of the second item of optical information without running, wherein the second item of optical information is preferably applied in the form of an image, text, logo, photograph, bar code, film, guilloche pattern, design element and/or other security-relevant information. The term printable only describes the consistency of the expansion agent and/or contraction agent. Therefore in particular such expansion agents and/or contraction agents which are not applied by printing but are for example sprayed on and do not run are also to be interpreted as printable.

In the process according to the invention in step c1.2) or step b2.2) in an alternative embodiment at least one mask layer is partially applied to the volume hologram layer and then a layer of an expansion agent and/or contraction agent is applied over the full surface area to the mask layer and regions which are free therefrom of the volume hologram layer. Preferably the mask layer is thermally hardened and/or beam-hardened prior to application of the expansion agent and/or contraction agent. The mask layer is completely or at least partially impervious to the expansion agent and/or contraction agent. That provides for partial diffusion of the expansion agent and/or contraction agent into the volume hologram layer, with the provision of the second item of optical information, preferably an image, text, logo, photograph, bar code, film, or other security-relevant information. Accordingly the mask layer is applied to the volume hologram layer everywhere that no or reduced diffusion of the expansion agent and/or contraction agent into the volume hologram layer is to occur.

In an embodiment of the process according to the invention, an expansion agent is used, which includes a polymerisable monomer and/or a polymerisable preliminary stage of a polymer. Preferably the expansion agent is a polymerisable monomer and/or a polymerisable preliminary stage of the polymer of which the photopolymer carrier medium consists or is at least compatible therewith. The term compatible in this context is used to mean that the polymer of the photopolymer layer and the monomer and/or the preliminary stage of the polymer are or can be linked to each other in a polymerisation operation.

Acrylates, in particular ethylene ethyl acrylate (EEA), diethylene glycol diacrylate, thiophene-2,5-dicarboxylic acid (TDA), isobornyl acrylate, trimethylol propane triacrylate, aromatic monomers such as 2-phenylethyl acrylate, 2-phenoxyethyl methacrylate, 2-phenoxyethyl acrylate (POEA), phenyl acrylate, mixtures of 2-naphthyl acrylate/POEA, preferably in a ratio of 1:3 to 1:5, can be used as the expansion agent. A binding agent such as an aliphatic or aromatic binding agent can be added to the expansion agent. The expansion agent used can be for example cellulose acetate butyrate (CAB), PMMA, polystyrene/acrylonitrile copolymerisates (PSAN), and/or styrene/methyl methacrylate copolymers (PSMMA).

Diffusion of the expansion agent and/or the contraction agent is reversible or irreversible. Preferably the expansion agent and/or contraction agent is fixed within the volume hologram layer. That makes it possible to stop diffusion. Preferably the expansion agent and/or contraction agent is beam-hardenable or thermally hardenable, whereby fixing can be effected. The degree of diffusion can be controlled by the choice of the moment in time of fixing. Alternatively or cumulatively the expansion agent and/or contraction agent can be washed off the volume hologram layer. In that way expansion and/or contraction can also be stopped after a certain time.

In an alternative embodiment at least one barrier layer is applied to the side of the volume hologram on which the expansion agent and/or contraction agent is applied. The barrier layer is completely or at least substantially impervious to the expansion agent and/or contraction agent. In that way, partial diffusion of the expansion agent and/or contraction agent out of the volume hologram layer is prevented and/or reduced, whereby the second item of optical information is fixed in the volume hologram layer even without thermal hardening or beam hardening. In an embodiment a barrier layer is also applied on the side of the volume hologram on which no expansion agent and/or contraction agent is applied.

Preferably the expansion agent and/or contraction agent is applied to the volume hologram layer or mask layer respectively in a layer thickness of 10 to 100 μm, preferably 15 to 30 μm, most preferably 15 to 25 μm. Lateral diffusion is minimised by thin layer thicknesses of that kind. The expansion agent and/or contraction agent can additionally be hardened after application. Hardening of the expansion agent and/or contraction agent can be effected prior to or after application of a barrier layer. In the case of subsequent hardening the barrier layer is to be beam-translucent, in particular UV-translucent. The barrier layer can also be beam-hardened and/or thermally hardened. Hardening of the expansion agent and/or contraction agent and the barrier layer can be effected in one step. The use of a mask layer permits more accurate application by printing than if the diffusion-capable expansion agent and/or contraction agent are applied by printing. Preferably a resolution of 250 to 1500 dpi, further preferably 400 to 1200 dpi, most preferably 800 to 1000 dpi, is achieved. Preferably the material of the mask layer can be applied by printing without running. When using a mask layer, solvents such as for example acetone, pyridine, dichloromethane, optionally mixed with water or isopropanol, can also be used as the expansion agent. The use of polymerisable compounds as the expansion agent and/or contraction agent is however preferred as solvents cause only temporary expansion of the volume hologram layer which is reversible as the solvents diffuse out of the volume hologram layer again when drying.

In an embodiment the barrier layer and/or mask layer used is as follows:

hexane diol dimethacrylates (HDDA) 25 to 40% by weight, preferably 30 to 35% by weight, pentaerythritol triacrylate 55 to 70% by weight, preferably 60 to 65% by weight, photoinitiator 3 to 10% by weight, preferably 5 to 7% by weight, with respect to the total weight of the barrier layer.

The mask layer and/or the barrier layer can be applied by ink jet printing, intaglio printing, reverse gravure, microgravure, reverse slip, reverse roll, screen printing, offset printing, flexoprinting and/or lithography. The expansion agent and/or contraction agent can be applied by ink jet printing, intaglio printing, reverse gravure, microgravure, reverse slip, reverse roll, screen printing, offset printing and/or flexoprinting.

In an embodiment the security element with the barrier layer is connected to a security document by way of an adhesive layer.

While the mask layer permits partial diffusion of the expansion agent and/or contraction agent into the volume hologram layer or partial suction of monomers or other low-molecule compounds out of the volume hologram layer, the barrier layer further preferably prevents adhesive diffusing into the volume hologram layer out of the adhesive layer with which the security element is applied to a security document, and causing a colour shift there. Furthermore the barrier layer can also prevent volatile compounds from diffusing out of the volume hologram layer. Thus the barrier layer should only ever be applied after application of the expansion agent and/or contraction agent.

In an embodiment of the process according to the invention the expansion agent and/or contraction agent which has not diffused into the volume hologram layer is at least partially removed. That has the advantage that further expansion and/or contraction of the Bragg planes is prevented and the security element becomes thinner.

The colour effect caused by the increase or reduction in the spacing of the Bragg planes can be caused by various measures. The expansion agent and/or contraction agent can be applied in various concentrations and/or thicknesses and/or different expansion agents and/or contraction agents with different diffusion characteristics can be applied. Thereafter it is made possible for the expansion agent and/or contraction agent to diffuse into the volume hologram layer, for example simply by leaving the expansion agent and/or contraction agent on the volume hologram layer during a time for which it or they act. At least partial diffusion of the expansion agent and/or contraction agent into the volume hologram layer is permitted. Therefore at least one expansion agent and/or contraction agent is introduced within the volume hologram layer in the form of a pattern, wherein the expansion agent and/or contraction agent alters a lattice plane spacing of the lattice planes of the Bragg grating within the volume hologram layer and a second item of optical information is provided. The amount of expansion agent and/or contraction agent diffused into the volume hologram layer can be influenced by the applied amount, the concentration, the temperature and the period of action.

Advantageously the expansion agent and/or contraction agent is already applied in the amount which achieves the desired colour change upon complete diffusion into the volume hologram layer. The correct action time can be determined by spectroscopic measurement procedures, for example reflection, absorption or transmission, in respect of the irradiated light. In an embodiment a certain surface area of the volume hologram layer is irradiated with white light and the absorption spectrum of the transmitted light is determined. Alternatively the colour shift can also be measured in the reflected light mode.

Different measures can be combined for multi-colour images. In an embodiment in step c1) or b2) the expansion agent and/or contraction agent is applied in at least two different levels of concentration and/or thicknesses and/or at least two different expansion agents and/or contraction agents having different diffusion characteristics are applied.

In an embodiment any desired colour can be produced by the arrangement of three respective different colour points side-by-side as a three-colour point. In that case the colour points are so small that they cannot be individually resolved with the human eye but a mixed colour (additive mixing) of the colour impressions of the colour points can be perceived. Preferably operation is implemented with a combination of the colours red, green and blue. A multi-coloured or true-coloured image can be produced by the combination of a multiplicity of such three-colour points.

The object is further attained by a security element in the form of a multi-layer film body, in particular a lamination film or transfer film, wherein the security element has a volume hologram layer comprising a photopolymer, wherein different refractive indices are formed region-wise to give a Bragg grating with the provision of a first item of optical information, wherein at least one expansion agent and/or contraction agent is introduced in the form of a pattern within the volume hologram layer, which alters the lattice plane spacing of the lattice planes of the Bragg grating within the volume hologram layer, wherein a second item of optical information is provided.

In an embodiment of the security element a printable expansion agent and/or printable contraction agent is used. Preferably, arranged on the volume hologram layer is a mask layer which is at least partially impervious to the expansion agent and/or contraction agent. In addition at least one barrier layer can be arranged on the volume hologram layer and/or the mask layer. Preferably the security element can be produced in accordance with the above-described process.

It is possible for the security element to have a layer or plane in which the expansion agent and/or contraction agent is applied.

A separation layer can be arranged between the plane in which the expansion agent and/or contraction agent is or has been applied and the volume hologram layer. A separation layer can be arranged between the plane in which the expansion agent and/or contraction agent is or has been applied and the mask layer or between the plane of the mask layer and the volume hologram layer. Alternatively the expansion agent and/or contraction agent can also be present in encapsulated form.

The security element according to the invention can be in the form of a lamination film or a transfer film. A lamination film is used in particular as a lamination strip, overlay or cover layer, or label, cambric, security thread or window element. A transfer film is preferably a hot embossing film.

In an embodiment the security element has a carrier film. The security element can also have a barrier layer. Preferably the carrier film is arranged on the one side of the volume hologram layer and the barrier layer is arranged on the other side of the volume hologram layer.

Preferably the layers of the security element are arranged as follows:
  carrier film
  expansion agent and/or contraction agent
  optionally mask layer
  volume hologram layer
  optionally barrier layer
or
  carrier film
  volume hologram layer
  optionally mask layer
  expansion agent and/or contraction agent
  optionally barrier layer.

In an embodiment the security element according to the invention is provided with further optical-diffraction effects such as for example optical-diffraction structures having kinematic effects and/or filigree metal structures in coincident relationship with relief structures having optical-diffraction effects.

A further barrier layer can additionally be arranged on the side of the volume hologram layer, that is away from the viewer.

The terms defined in relation to the process and preferred embodiments can also be similarly transferred on to the security element.

BRIEF DESCRIPTION OF THE DRAWINGS

The invention is illustrated by way of example hereinafter by means of a number of embodiments with reference to the accompanying drawings.
Examples
FIG. 1 shows a diagrammatic view of a procedure of an embodiment of the process according to the invention for the production of a security element, wherein the expansion agent is selectively applied by printing.

FIG. 2 shows a diagrammatic view of the procedure of a further embodiment of the process according to the invention for the production of a security element, using a mask layer for selectively applying the expansion agent.

FIG. 3 shows a diagrammatic view of the procedure of a further embodiment of the process according to the invention for the production of a security element, wherein the expansion agent is selectively applied by printing to the volume hologram layer in two different thicknesses/concentrations.

FIG. 4 shows a plan view of the security element with the first and second items of optical information.

DETAILED DESCRIPTION OF THE INVENTION

Figure 1A:
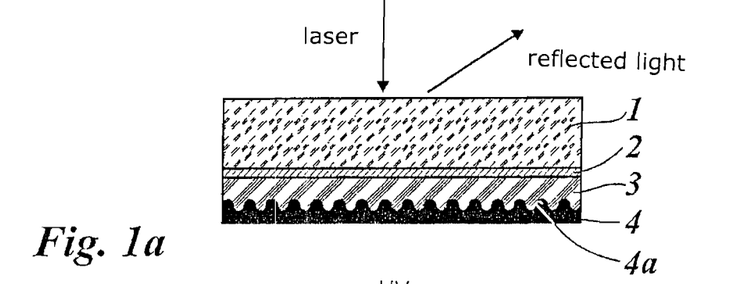
Figure 1B:
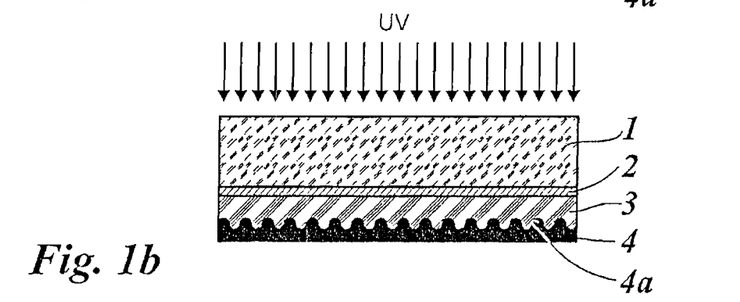
Figure 1C:
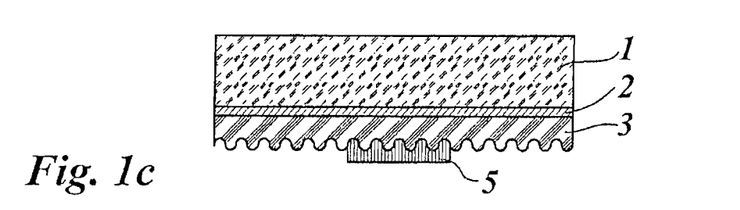
Figure 1D:
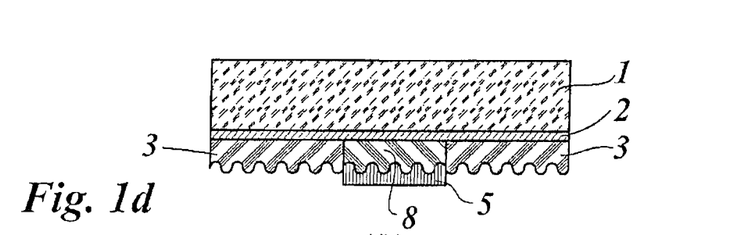
Figure 1E:
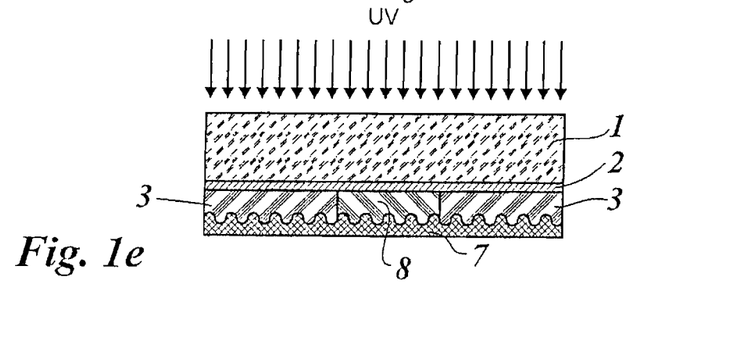

In an embodiment of the process according to the invention a photopolymer layer 3 applied to a carrier film 1, possibly to functional intermediate layers 2 further applied thereto, is brought into contact with the front side of a layer 4 having a surface relief 4a. The surface relief 4 is then exposed with coherent light through the photopolymer layer, wherein an interference pattern is formed by the superimposition of the light radiated on the surface relief 4a and the light diffracted by the surface relief; the interference pattern writes a volume hologram in the photopolymer layer (FIG. 1a). The volume hologram introduced into the photopolymer layer 3 is then fixed after at least partial hardening of the photosensitive layer (FIG. 1b). The layer with the surface relief 4 can then be removed from the photopolymer 3. An expansion agent 5 is printed on to the surface of the photopolymer (FIG. 1c). The expansion agent 5 preferably diffuses at elevated temperature of preferably 30° C. into the photopolymer layer 3 in about 5 minutes, providing a photopolymer layer which in the corresponding region has an increased spacing of the Bragg planes 8 (FIG. 1d). The expansion agent remaining at the surface of the volume hologram layer can be removed. The security element is hardened by UV radiation prior to or after application of a barrier layer 7 (FIG. 1e).

Figure 2A:
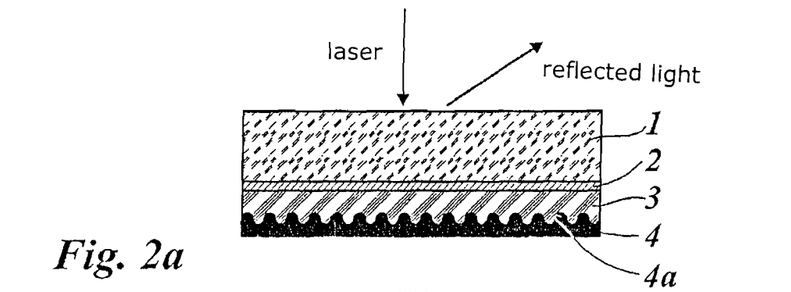
Figure 2B:
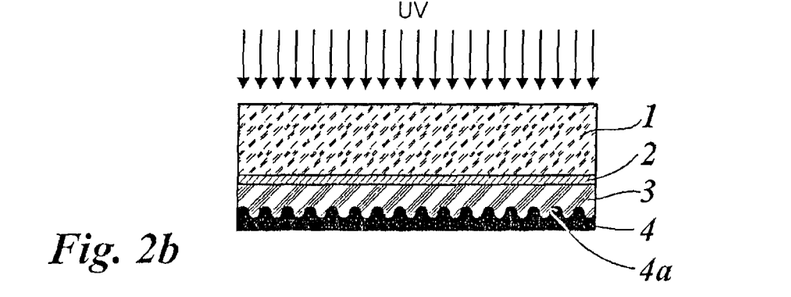
Figure 2C:
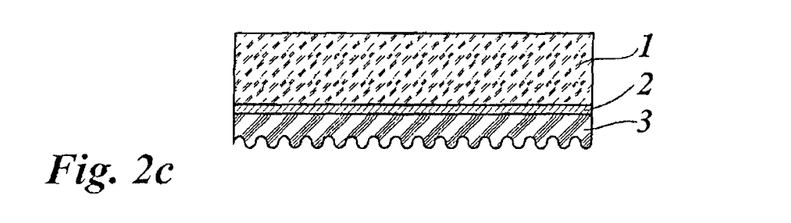
Figure 2D:
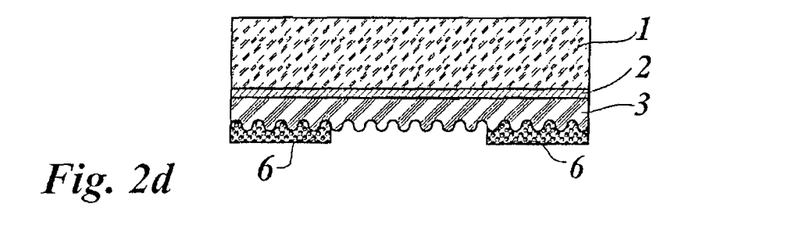
Figure 2E:
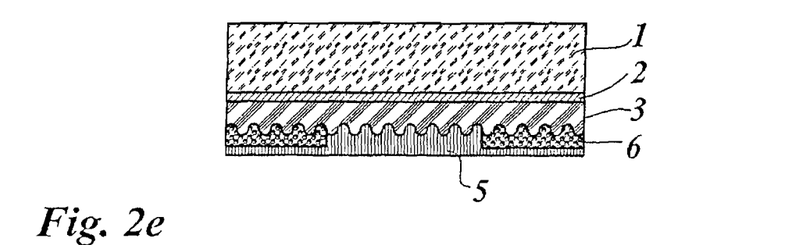
Figure 2F:
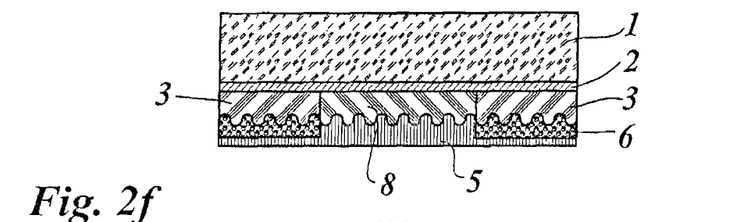
Figure 2G:
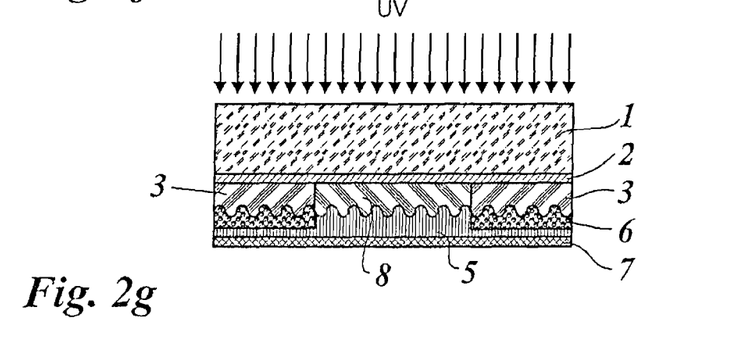

In another embodiment of the process according to the invention a photopolymer layer 3 applied to a carrier film 1, possibly to a functional intermediate layer 2 further applied thereto, is brought into contact with a layer 4 of a surface relief master 4a. Then the surface relief 4a is exposed with coherent light through the photopolymer layer 3, wherein an interference pattern is produced by superimposition of the light radiated on the surface relief and the light diffracted by the surface relief; the interference pattern is written in the photopolymer layer 3 as a volume hologram (FIG. 2a). The volume hologram introduced into the photopolymer layer 3 in that way is then fixed after at least partial hardening of the photopolymer layer (FIG. 2b). That layer is also referred to as a volume hologram layer. Then the layer with the surface relief 4a can be removed from the photopolymer 3 (FIG. 2c). A mask layer 9 in the form of a pattern and/or image can be applied by printing to the surface of the photopolymer 3 (FIG. 2d). The volume hologram layer partially covered with the mask layer is covered completely with an expansion agent 5 (FIG. 2e). The expansion agent 5 preferably diffuses at elevated temperature, preferably about 30° C., into the photopolymer layer 3 in about 5 minutes, providing a photopolymer layer 8 which in the corresponding region has an increased spacing of the Bragg planes (FIG. 2f). The expansion agent 5 which has remained at the surface of the volume hologram layer can be removed. The security element can be hardened by UV radiation prior to and/or after application of a barrier layer 7 (FIG. 2g).

Figure 3A:
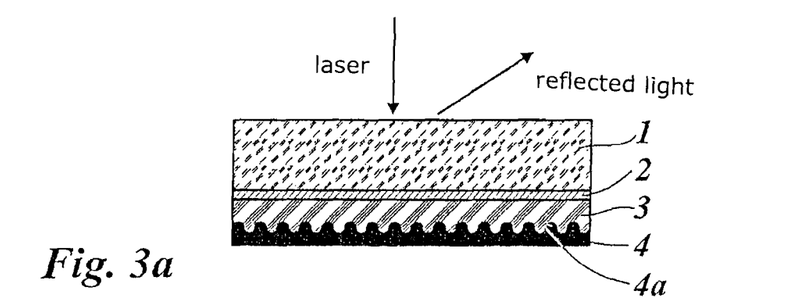
Figure 3B:
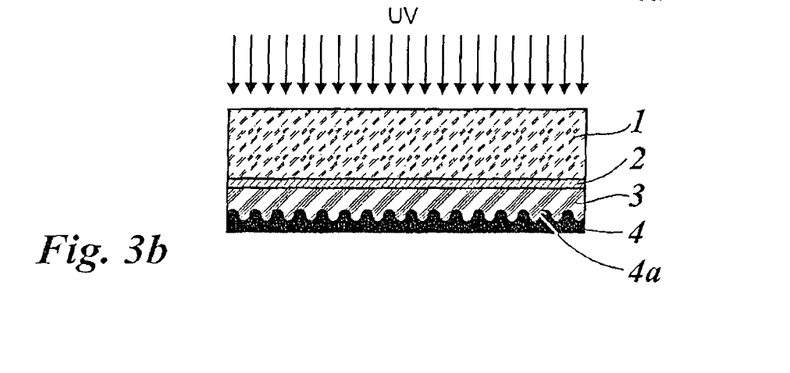
Figure 3C:
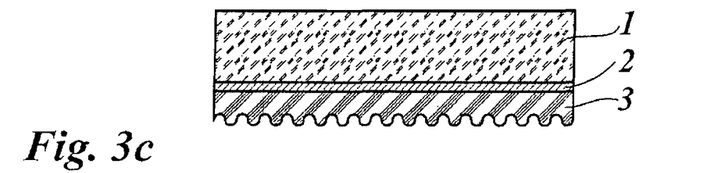
Figure 3D:
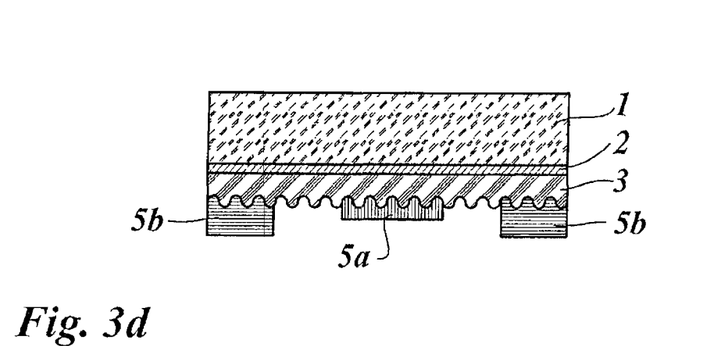
Figure 3E:
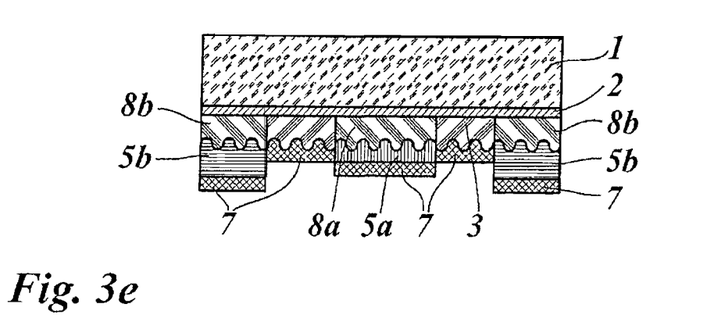

In an embodiment of the process according to the invention a photopolymer layer 3 applied to a carrier film 1, possibly to functional intermediate layers 2 further applied thereto, is brought into contact with the front side of a layer 4 having a surface relief 4a. The surface relief 4a is then exposed with coherent light through the photopolymer layer 3, wherein an interface pattern is produced by superimposition of the light radiated on to the surface relief and the light diffracted by the surface relief; the interference pattern is written in the photopolymer layer as a volume hologram (FIG. 3a). The volume hologram introduced in the photopolymer layer in that way is then fixed after at least partial hardening of the photopolymer layer 3 (FIG. 3b). Then the layer 4 with the surface relief master 4a can be removed from the photopolymer 3 (FIG. 3c). An expansion agent 5 can be applied by printing in different thickness or with different levels of concentration (5a, b) to the surface of the photopolymer (FIG. 3d). The expansion agent 5 preferably diffuses at elevated temperature, preferably about 30° C., into the photopolymer layer 8a, b which in the corresponding region has an increased spacing of the Bragg planes (FIG. 3e), wherein different expansion of the volume hologram layer 3 takes place in dependence on the amount/concentration of the diffused expansion agent 5. The expansion agent 5 which remains at the surface of the volume hologram layer can be removed. The security element is hardened by UV radiation after the application of a barrier layer 7 (FIG. 3f).

Figure 4A:
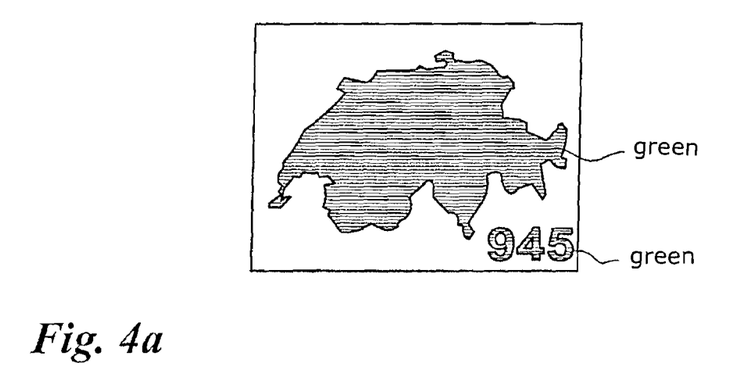

FIG. 4a shows a plan view of a volume hologram without colour change by the diffusion of an expansion agent. The volume hologram is in the form of the outline of Switzerland and the number 945 is visible in a green colour.

Figure 4B:
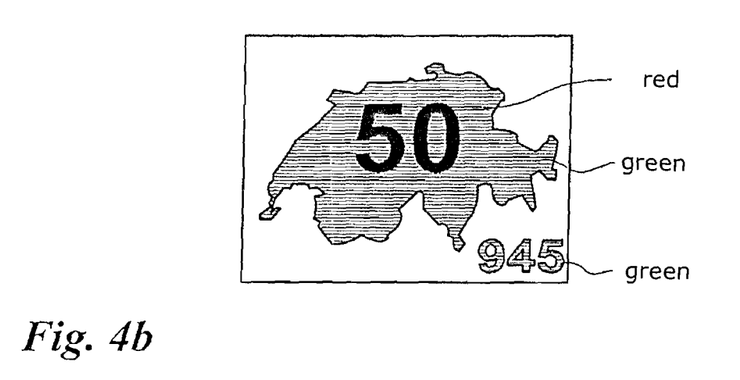

FIG. 4b shows a plan view of a volume hologram with colour change by diffusion of an expansion agent. The volume hologram is in the form of the outline of Switzerland and the number 945 is visible in a green colour. In addition the number 50 is written in a red colour into the map of Switzerland by the diffusion of an expansion agent therein.

LIST OF REFERENCES 1 carrier film
2 functional layers
3 photopolymer/volume hologram layer
4 layer with surface relief
4a surface relief
5 expansion agent
6 mask layer
7 barrier layer
8 expanded volume hologram layer

The invention claimed is:
1. A process for the production of a security element in the form of a multi-layer film body including the steps:
providing a carrier film;
applying a volume hologram layer formed from a photopolymer to the carrier film, the volume hologram layer having a volume hologram written into the photopolymer, the volume hologram providing a first item of information;
applying at least one mask layer to the volume hologram layer, wherein the at least one mask layer is partially applied to the volume hologram layer in the form of a pattern;
applying a full-area layer of at least one beam-hardenable or thermally hardenable expansion agent and/or contraction agent to the mask layer, wherein regions of the volume hologram layer not covered by the mask layer are in contact with the at least one expansion agent and/or contraction agent;
allowing at least partial diffusion of the at least one expansion agent and/or contraction agent into the volume hologram layer with local expansion and/or contraction of the Bragg grating, thereby altering the volume hologram in the volume hologram layer to provide a second item of optical information, and
beam hardening or thermally hardening
the carrier film, the volume hologram layer, the mask layer, and the at least one expansion agent and/or contraction agent together to produce a multi-layer film body arranged as follows:
carrier film,
volume hologram layer,
mask layer,
expansion agent and/or contraction agent,
wherein the mask layer is part of the multi-layer film body and is at least partially impervious to the at least one expansion agent and/or contraction agent and has openings which are pervious to the at least one expansion agent and/or contraction agent, and
wherein different refractive indices are formed region-wise in the photopolymer of the volume hologram layer, which provide a Bragg grating with the provision of a first item of optical information, and wherein an adhesive layer is provided to the multi-layer film body for adhering the security element to a security document.

2. A process as set forth in claim 1, wherein the volume hologram is written into the photopolymer of the volume hologram layer providing the first item of optical information prior to diffusion of the expansion agent and/or contraction agent into the volume hologram layer.

3. A process as set forth in claim 1, wherein a separation layer is applied between the expansion agent and/or contraction agent and the volume hologram layer.

4. A process as set forth in claim 1, wherein the expansion agent and/or contraction agent which has not diffused into the volume hologram layer is at least partially removed.

5. A process as set forth in claim 1, wherein
a barrier layer is applied to the volume hologram layer and/or mask layer.

6. A process as set forth in claim 1, wherein the expansion agent and/or contraction agent is applied in at least two different levels of concentration and/or thicknesses and/or at least two different expansion agents and/or contraction agents having different diffusion characteristics are applied.

7. A process for the production of a security element in the form of a multi-layer film body including the steps:
providing a carrier film,
applying a full-area of at least one beam-hardenable or thermally hardenable expansion agent and/or contraction agent to the carrier film;
applying at least one mask layer, wherein the at least one mask layer is partially applied to the at least one expansion agent and/or contraction agent in the form of a pattern;
applying a volume hologram layer formed from a photopolymer to the at least one expansion agent and/or contraction agent and the mask layer which partially covers over the at least one expansion agent and/or contraction agent, the volume hologram layer having a volume hologram written into the photopolymer, the volume hologram providing a first item of information;
allowing at least partial diffusion of the at least one expansion agent and/or contraction agent into the volume hologram layer with local expansion and/or contraction of the Bragg grating, thereby altering the volume hologram in the volume hologram layer to provide a second item of optical information, and
beam hardening or thermally hardening
the carrier film, the volume hologram layer, the mask layer, and the at least one expansion agent and/or contraction agent together to produce a multi-layer film body arranged as follows:
carrier film,
expansion agent and/or contraction agent,
mask layer,
volume hologram layer,
wherein the mask layer is part of the multi-layer film body and is at least partially impervious to the at least one expansion agent and/or contraction agent and has openings which are pervious to the at least one expansion agent and/or contraction agent, and
wherein different refractive indices are formed region-wise in the photopolymer of the volume hologram layer, which refractive indices provide a Bragg grating with the provision of a first item of optical information, and
wherein an adhesive layer is provided to the multi-layer film body for adhering the security element to a security document.

8. A process as set forth in claim 7, wherein the volume hologram is written into the photopolymer of the volume hologram layer providing the first item of optical information prior to diffusion of the expansion agent and/or contraction agent into the volume hologram layer.

9. A security element in the form of a multi-layer film body, wherein the security element has a volume hologram layer comprising a photopolymer, wherein different refractive indices are formed region-wise in the photopolymer to give a Bragg grating with the provision of a first item of optical information, wherein at least one beam-hardened or thermally hardened expansion agent and/or contraction agent is introduced in the form of a pattern within the volume hologram layer, which alters the lattice plane spacing of the lattice planes of the Bragg grating within the volume hologram layer, wherein a second item of optical information is provided, wherein a mask layer has been applied to the volume hologram layer in the regions in which the at least one expansion agent and/or contraction agent does not provide a pattern, wherein the mask layer is part of the multi-layer film body and is at least partially impervious to the at least one expansion agent and/or contraction agent and has openings which are pervious to the at least one expansion agent and/or contraction agent, and wherein an adhesive layer is provided to the multi-layer film body for adhering the security element to a security document.

10. A security element as set forth in claim 9, wherein the second item of optical information represents an image, text, logo, photograph, bar code, film, guilloche pattern, design element and/or other security-relevant information which is independent of the first item of optical information.

11. A security element as set forth in one of claim 9, wherein a separation layer is arranged between a plane in which the expansion agent and/or contraction agent is applied and the volume hologram layer.

12. A security element as set forth in claim 9, wherein at least one barrier layer is produced on the volume hologram layer and/or the mask layer.

13. A security element as set forth in claim 9 wherein the security element has a carrier film.

14. A security element as set forth in claim 13, wherein the security element has a carrier film which is provided on the one side of the volume hologram layer and a barrier layer which is provided on the other side of the volume hologram layer.

15. A security element as set forth in claim 14, wherein the layers are arranged as follows:
carrier film,
expansion agent and/or contraction agent,
mask layer,
volume hologram layer,
barrier layer,
or
carrier film,
volume hologram layer,
mask layer,
expansion agent and/or contraction agent,
barrier layer,
wherein the adhesive layer is in contact with the carrier film or the barrier layer.

16. A security element as set forth in claim 15, wherein a separation layer is arranged either between the volume hologram layer and the mask layer or between the mask layer and the expansion agent and/or contraction agent.

17. A security element as set forth in claim 9, wherein the multi-layer film body is a lamination film.

18. A security element as set forth in claim 9, wherein the multi-layer film body is a transfer film.

* * * * *

UNITED STATES PATENT AND TRADEMARK OFFICE
CERTIFICATE OF CORRECTION

PATENT NO.        : 8,507,154 B2
APPLICATION NO. : 13/124557
DATED             : August 13, 2013
INVENTOR(S)       : Hansen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 116 days.

Signed and Sealed this
Fifteenth Day of September, 2015

Michelle K. Lee
*Director of the United States Patent and Trademark Office*